Figure 2:
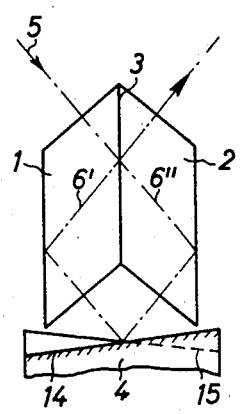

United States Patent Office 2,911,880
Patented Nov. 10, 1959

2,911,880
INTERFEROMETER

Kurt Rantsch, Wetzlar, Hesse, Germany, assignor to Carl Zeiss, Heidenheim (Brenz), Wurttemberg, Germany Application August 22, 1956, Serial No. 605,678

Claims priority, application Germany August 27, 1955

2 Claims. (Cl. 88—14)

In my copending application Ser. No. 568,419, filed February 28, 1956, now Patent No. 2,857,804, an interferometer is described having one surface serving to divide and reunite the light rays, as well as a reflecting surface inclinable with respect to the first surface, and further mirror surfaces rigidly connected to the dividing and reuniting surface, wherein furthermore the surfaces are so arranged that the divided light rays take opposite courses in the interferometer. An interferometer constructed in this way is particularly suitable for the exact setting of angles, for instance of the angle included by the relatively inclinable surface with the dividing and reuniting surface. At every inclination of one of these two surfaces relative to the other there alters in consequence the number of the interference fringes in the field of view, so that a measure for the inclination may be expressed by the number of the interference fringes.

In further development of the principle of this application it is an object of the present invention to provide means for the production of two coinciding interference fringe images. Such means carry the advantage that upon inclination of the relatively inclinable reflecting surface in the one moiety of the field of view the image of the interference fringes is differently influenced from the other, so that e.g. the number of interference fringes in one half of the field of view is increased while it is reduced in the other. Since one may easily design the means for producing the two interference fringe images in such a way that in the zero position of the relatively inclinable reflecting surface the fringes of both images are in the coincidence position, one can on the one hand always recognize the zero position uncontroversially by the image of the interference fringes, and on the other hand one can recognize the amount of the inclination-deviation from the zero position from the difference of the numbers of fringes in the two images, and finally also the sign of this deviation according to the number of interference fringes being larger in the one image or in the other.

As means for the production of two interference fringe images of the kind described there serves with advantage a double wedge arranged in the raypath of the interferometer and deflecting the rays in two different directions. The double wedge is advantageously located in the vicinity of the relatively inclinable reflecting surface, since in the interferometer according to the invention the interference phenomenon is situated in the plane of the relatively inclinable reflecting surface. It can therefore only be seen with equal sharpness with the dividing edge of the double wedge which corresponds to the line separating the interference fringe images, if this dividing edge can be arranged sufficiently closely to the relatively inclinable surface.

If such an arrangement is not possible one may in a different embodiment of the invention advantageously divide the relatively inclinable surface into two parts having different inclinations with respect to the incident light. A reflecting surface thus divided has the same effect as the double wedge, but with the advantage that the dividing edge can always be sharply focussed together with the image of the interference fringes.

Figure 1:
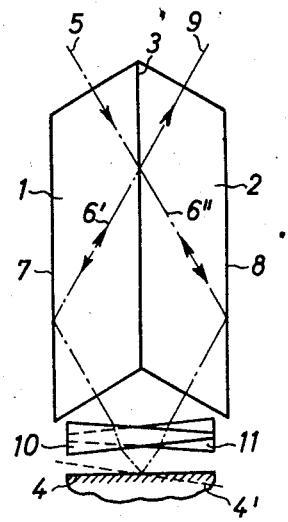
Figure 3:
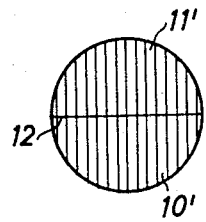
Figure 4:
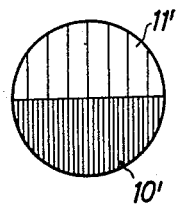

Upon the drawing two embodiments of the object of the invention are represented, and more particularly there show Fig. 1 the interferometer of my copending application with a double wedge interposed according to the invention, Fig. 2 the interferometer of my copending application with a divided reflecting surface, Figs. 3 and 4 the field of view of the interferometer according to Figs. 1 and 2 at different inclinations of the reflecting surface.

In Fig. 1 two prisms 1 and 2 of parallelepipedic form are cemented together and a semi-transmitting mirror layer 3 is arranged in the cemented surface. Below the prisms a reflecting surface 4 is provided. A light ray 5 which is incident upon the semi-transmitting mirror layer 3 is divided into the portions 6' and 6''. The portions 6' and 6'' are reflected at the external surfaces 7 and 8 of the prisms 1 and 2 as well as at the mirror surface 4, so that they pass through the interferometer in opposite directions. In the semi-transmitting mirror layer the parts of the ray interfere and leave the interferometer as the reunited ray 9. If the mirror surface 4 is exactly perpendicular to the semi-transmitting mirror surface 3, the parts 6' and 6'' of the ray will show no differences of phase upon their reunion in the semi-transmitting mirror surface. The interference fringes produced are therefore of infinite width. If one now places a double wedge combined of two equal wedges 10 and 11 turned through 180° with respect to each other between the prisms 1 and 2 and the mirror surface 4 in this arrangement, then wedge interference is produced as represented in Fig. 3.

The dividing line 12 in Fig. 3 corresponds in this arrangement to the edge where the wedges 10 and 11 touch each other. Let the interference fringe image 11' above the dividing line 12 be produced by the wedge 11 and the image 10' below the dividing line 12 by the wedge 10.

If now the mirror surface 4 is somewhat inclined, e.g. into the position 4' drawn in dashed outline, the part rays 6' and 6'' will be incident at different angles upon the mirror surface 4'—i.e. an additional wedge effect is produced which causes the interference fringes in image 11' to separate and those in image 10' to close up (Fig. 4). On the other hand the mirror can easily and with extreme accuracy be rotated into a position exactly at right angles to the semi-transmitting mirror layer 3 by merely turning it until the interference fringe images 10' and 11' come to coincidence.

The arrangement described requires a distance of the reflecting surface 4 from the prisms 1 and 2 large enough to permit the arrangement of the double wedge 10 and 11 between these parts.

Fig. 2 shows an embodiment in which this distance may be kept relatively small. Instead of the double wedge 10 and 11 of the Fig. 1 the mirror 4 is here divided into two parts 14 and 15 with different inclinations. The angles of inclination are so selected that they are equal but of opposite sign in the zero position of the mirror 4 relative to the plane of the semitransmitting mirror layer 3. Thereby wedge interferences are again produced in the zero position of the mirror 4 as they are represented in Fig. 3. If the mirror 4 is somewhat tilted in the anticlockwise direction in the plane of the drawing, then the angle of inclination of the mirror surface 15 becomes smaller and that of the mirror surface 14 larger. An interference fringe image like that in Fig. 4 is therefore formed, i.e. in the image field 10' the interference fringes lie more closely together than in the image field 11', wherein the image 11' corresponds to the interference arising at the surface 15, and the image 10' to those arising at the surface 14. The dividing edge between the mirror surfaces 14 and 15 can here always be sharply focussed in the field of view together with the interference fringes, as distinct from the embodiment shown in Fig. 1, because the interference phenomena arise in the plane of the reflecting surface of the mirror 4.

I claim:

1. A device for determining the inclination of a body comprising a first and a second parallelepipedic prism forming an interferometric arrangement with a mirror adapted to be connected on said body, each of said prisms having a first outer surface, said prisms being cemented together at their outer surfaces, a semi-reflecting surface arranged between the two cemented prisms to divide an impinging light beam into two separate beams and to reunite the two separate beams, each prism having a first and a second light transmitting surface and a totally reflecting outer surface, the impinging light beam entering the interferometric arrangement through the first light transmitting surface of said second prism, said totally reflecting outer surface of each prism reflecting the separate beams coming from the semi-reflecting surface through the second light transmitting surface of each prism to said mirror and reflecting the separate beams coming from said mirror towards the said semi-reflecting surface, so that the separate beams impinge on the semi-reflecting surface at substantially the same angle of incidence but in opposite directions to produce an interference pattern of light passing through the first outer transmitting surface of said first prism, said mirror consisting of two parts, said parts having reflecting surfaces inclined one against the other so that the prolongations of the reflecting surfaces of said parts intersect in a line lying in the prolongation of said semi-reflecting surface to effect two images of interference fringes.

2. A device for determining the inclination of a body comprising a first and a second parallelepipedic prism forming an interferometric arrangement with a mirror adapted to be connected on said body, each of said prisms having a first outer surface, said prisms being cemented together at their outer surfaces, a semi-reflecting surface arranged between the two cemented prisms to divide an impinging light beam into two separate beams and to reunite the two separate beams, each prism having a first and a second light transmitting surface and a totally reflecting outer surface, the impinging light beam entering the interferometric arrangement through the first light transmitting surface of said second prism; said totally reflecting outer surface of each prism reflecting the separate beams coming from the semi-reflecting surface through the second light transmitting surface of each prism to said mirror and reflecting the separate beams coming from said mirror towards the said semi-reflecting surface, so that the separate beams impinge on the semi-reflecting surface at substantially the same angle of incidence but in opposite directions to produce an interference pattern of light passing through the first outer transmitting surface of said first prism, two glass wedges arranged between the said prisms and said mirror connected with said body, said wedges lying side by side but in opposite directions to change the direction of the separate beams transmitting them, to effect two images of interference fringes.

References Cited in the file of this patent

UNITED STATES PATENTS

| 1,561,173 | Koster | Nov. 10, 1925 |
| 2,718,811 | Riepert et al. | Sept. 27, 1955 |

FOREIGN PATENTS

| 595,211 | Germany | Apr. 12, 1934 |
| 1,057,486 | France | Oct. 28, 1953 |